United States Patent
Farzaneh et al.

(10) Patent No.: US 9,157,349 B2
(45) Date of Patent: Oct. 13, 2015

(54) HIGH POWER TWO CYCLE ENGINE (WITHOUT OIL AND GASOLINE/BENZENE MIXING)

(71) Applicants: Ali Farzad Farzaneh, Tehran (IR); Abdolreza Darabi, Tehran (IR)

(72) Inventors: Ali Farzad Farzaneh, Tehran (IR); Abdolreza Darabi, Tehran (IR)

(*) Notice: Subject to any disclaimer, the term of this patent is extended or adjusted under 35 U.S.C. 154(b) by 0 days.

(21) Appl. No.: 14/336,850

(22) Filed: Jul. 21, 2014

(65) Prior Publication Data
US 2015/0252722 A1 Sep. 10, 2015

Related U.S. Application Data

(60) Provisional application No. 61/966,770, filed on Mar. 19, 2014.

(51) Int. Cl.

| | | |
|---|---|---|
| F01M 11/08 | (2006.01) | |
| F16J 1/08 | (2006.01) | |
| F02B 75/02 | (2006.01) | |
| F02B 75/12 | (2006.01) | |
| F02M 31/02 | (2006.01) | |
| F01M 9/00 | (2006.01) | |
| F01M 1/12 | (2006.01) | |

(52) U.S. Cl.
CPC ........... *F01M 11/08* (2013.01); *F01M 1/12* (2013.01); *F01M 9/00* (2013.01); *F02B 75/02* (2013.01); *F02B 75/12* (2013.01); *F02M 31/02* (2013.01); *F16J 1/08* (2013.01); *F02B 2075/025* (2013.01); *F02B 2075/125* (2013.01)

(58) Field of Classification Search
CPC ...... F02B 2075/025; F16J 1/08; F01M 11/08; F01M 1/12

USPC .......... 123/294, 65 R, 193.4, 193.6
See application file for complete search history.

(56) References Cited

U.S. PATENT DOCUMENTS

| | | | | |
|---|---|---|---|---|
| 4,579,093 | A * | 4/1986 | Eanes ................... | 123/65 BA |
| 5,158,046 | A * | 10/1992 | Rucker ................. | 123/65 R |
| 5,730,096 | A * | 3/1998 | Atmur et al. ........ | 123/193.5 |
| 6,161,510 | A | 12/2000 | Ishikawa et al. | |
| 2003/0205212 | A1* | 11/2003 | Chen et al. ........... | 123/65 R |
| 2010/0024759 | A1* | 2/2010 | Dobransky ........... | 123/193.6 |

FOREIGN PATENT DOCUMENTS

| | | |
|---|---|---|
| DE | 4007488 A1 | 9/1991 |
| WO | WO 9853191 A1 * | 11/1998 ............ F02B 25/14 |

\* cited by examiner

*Primary Examiner* — Mahmoud Gimie

(57) ABSTRACT

An internal combustion engine of the two-cycle type comprises a cylinder and a combustion chamber defined by a piston slidable within the cylinder and a cylinder head. A fuel injection mechanism for injecting fuel into the combustion chamber is provided. A crankshaft provides reciprocating motion to the piston. Lubricating mechanism provides lubrication to the crankshaft. A mechanism around the bottom of the piston prevents crankshaft lubrication from reaching the combustion chamber. A valve prevents escape of oil from air and smoke openings. Oil is not mixed with the fuel in the combustion chamber. Heating mechanism is provided for heating the fuel prior to the fuel being injected into the combustion chamber. A command control for controlling timely opening and closing of the smoke and air valves, the spark plugs and the injector is provided. Contrary to cycle engines which have no valve it has two electric valve.

10 Claims, 6 Drawing Sheets

Detail A.A

Detail A.A

HIGH POWER TWO CYCLE ENGINE (WITHOUT OIL AND GASOLINE/BENZENE MIXING)

CROSS-REFERENCE TO RELATED PATENT APPLICATIONS

Embodiments of the present invention relate to U.S. Provisional Application Ser. No. 61/955,660, filed Mar. 19, 2014, entitled "TWO CYCLE GASOLINE/BENZENE BURNING ENGINE", the contents of which are incorporated by reference herein and which is a basis for a claim of priority.

BACKGROUND OF THE INVENTION

A two-stroke, two-cycle, or two-cycle engine is a type of internal combustion engine which completes a power cycle in only one crankshaft revolution and with two strokes, or up and down movements, of the piston in comparison to a "four-stroke engine", which uses four strokes. This is accomplished by the end of the combustion stroke and the beginning of the compression stroke happening simultaneously and performing the intake and exhaust (or scavenging) functions at the same time. (FIG. 2)

Two-stroke engines often provide high power-to-weight ratio, usually in a narrow range of rotational speeds called the "power band". Compared to 4-stroke engines, they have a greatly reduced number of moving parts, are more compact and significantly lighter. Gasoline (spark ignition) versions are particularly useful in lightweight (portable) applications such as chainsaws and motorcycles. Two-stroke engines have higher exhaust emissions than four-stroke engines.

The lower cost to rebuild and maintain made the two stroke engine popular. However, due to recent concerns and regulations concerning environmental impact of these engines and the resulting emission regulations, the industry has largely to four-stroke petrol engines, which emit less pollution. Most small designs use petroil (two-stroke oil) lubrication, with the oil being burned in the combustion chamber, causing "black smoke" and other types of exhaust pollution. This is a major reason why two-stroke engines were replaced by four-stroke engines in many applications.

Simple two-stroke petrol engines continue to be commonly used in high-power, handheld applications such as string trimmers and chainsaws. The light overall weight, and lightweight spinning parts give important operational and even safety advantages. For example, a four-stroke engine to power a chainsaw operating in any position would be much more expensive and complex than a two-stroke engine that uses a gasoline-oil mixture.

Despite these problems, two cycle engines are still preferred for small, portable, or specialized machine applications such as outboard motors, high-performance, small-capacity motorcycles, mopeds, underbones, scooters, tuk-tuks, snowmobiles, karts, ultralights, model airplanes (and other model vehicles) and lawnmowers and dirt bikes.

Conventional two-cycle engines thus suffer from many drawbacks, including the mixture of oil and fuel incomplete combustion, which contributes to pollution inside and outside of the engine, as well as reduced, sub-optimal performances in power and speed.

There is a need for an engine that maintains the advantages of conventional two cycle engines, while addressing their deficiencies of high emission and pollution which are primarily caused by the combustion of oil and fuel mix in conventional two cycle engines.

SUMMARY OF THE INVENTION

The inventive improved two cycle engine does not utilize a fuel/oil mixture for combustion. Rather, fuel and oil are kept separate. An internal combustion engine of the inventive two-cycle type comprises a cylinder and a combustion chamber defined by a piston slidable within the cylinder and a cylinder head. A fuel injection mechanism for injecting fuel into the combustion chamber is provided (injector). A crankshaft provides reciprocating motion to the piston. Lubricating mechanism provides lubrication to the crankshaft.

A mechanism around the bottom of the piston prevents crankshaft lubrication from reaching the combustion chamber. A valve prevents escape of oil from air and smoke openings. Advantageously, oil is not mixed with the fuel in the combustion chamber. Heating mechanism is provided for heating the fuel prior to the fuel being injected into the combustion chamber. A command control for controlling timely opening of the smoke and air valves, the spark plugs and the injector is provided.

DETAILED DESCRIPTION OF THE PREFERRED EMBODIMENT(S) AND INVENTION

Figure 1:
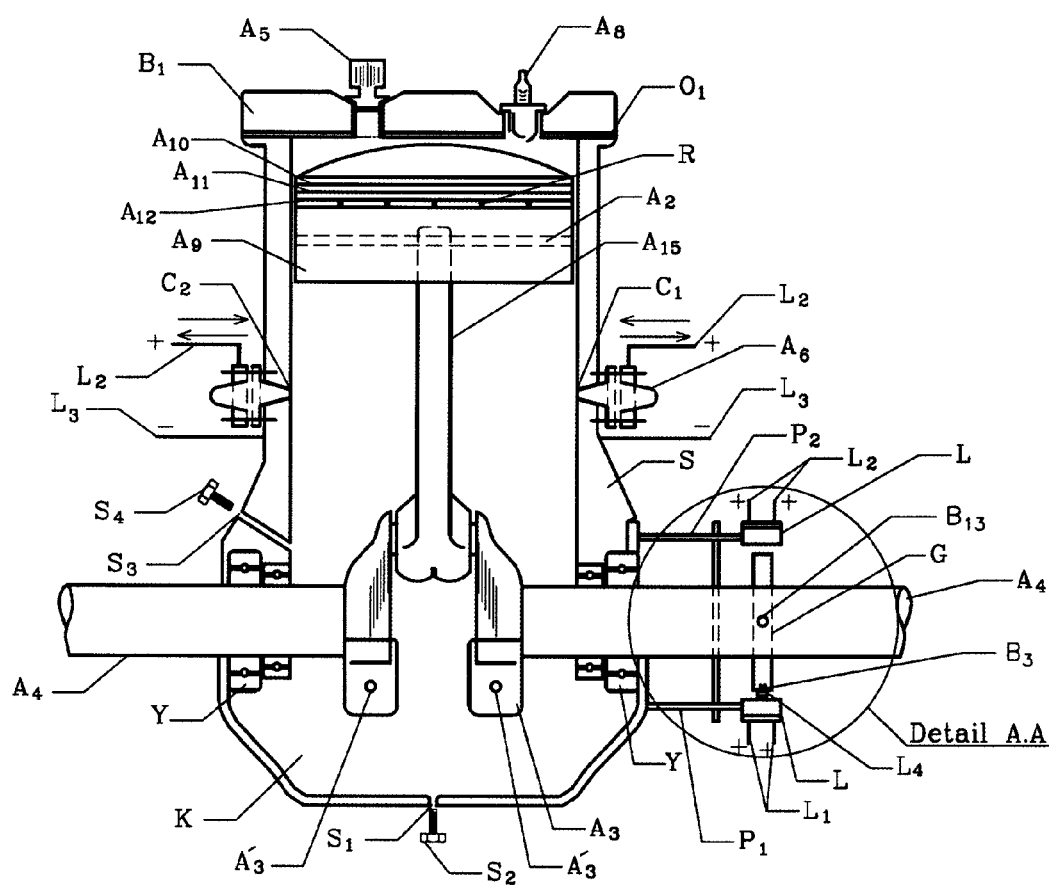
FIG. 1 is a detailed diagram according to an exemplary embodiment of the present invention. (Piston in the pre-combustion state)
Figure 2:
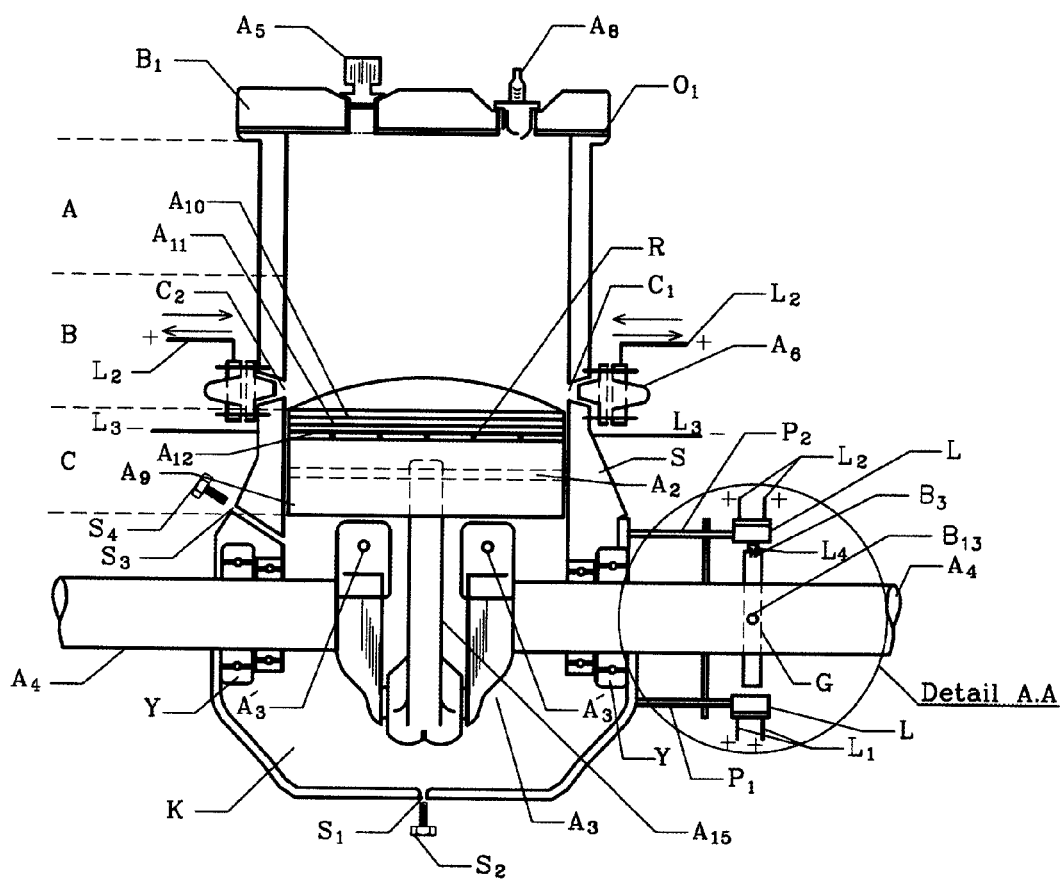
FIG. 2 is a detailed diagram according to an exemplary embodiment of the present invention. (Piston in the post-combustion state)

Name: two cycle, gasoline/benzene burning engine.
In this engine a mechanical system with electric valves (DC) has been used.
The engine parts include:
1. (S) Cylinder (FIGS. 1 and 2)
2. (B1) Cylinder head (FIGS. 1 and 2)
3. (O1) Cylinder head gasket (FIGS. 1 and 2)
4. (A9) Piston (FIGS. 1 and 2)
5. Rings including (A10) fire ring, (A11) compression ring, (A12) oil ring (FIGS. 1 and 2)
6. (A15) Connecting rod (FIGS. 1 and 2)
7. (A3) Crankshaft anchor (FIGS. 1 and 2)
8. (A4) Crankshaft shaft (FIGS. 1 and 2)
9. (G) Bushing on the crankshaft shaft (FIGS. 1, 2, 4A, 4B, 5A and 5B)
10. (P1) & (P2) Command circuitry base (FIGS. 1, 2, 4A, 4B, 5A and 5B)
11. (L) Sensor (FIGS. 1, 2, 4A, 4B, 5A, 5B and 6)
12. (A6) Valves (FIGS. 1 and 2)
13. (A8) Spark plug (FIGS. 1 and 2)

Figure 3A:
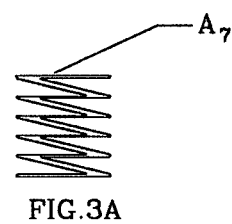
FIGS. 3A-3C are diagrams of the engine valve spring according to an exemplary embodiment of the present invention.
Figure 3B:
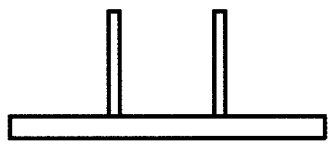
Figure 3C:
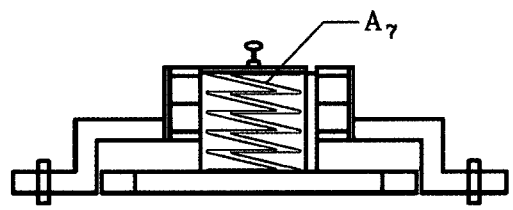
Figure 4A:
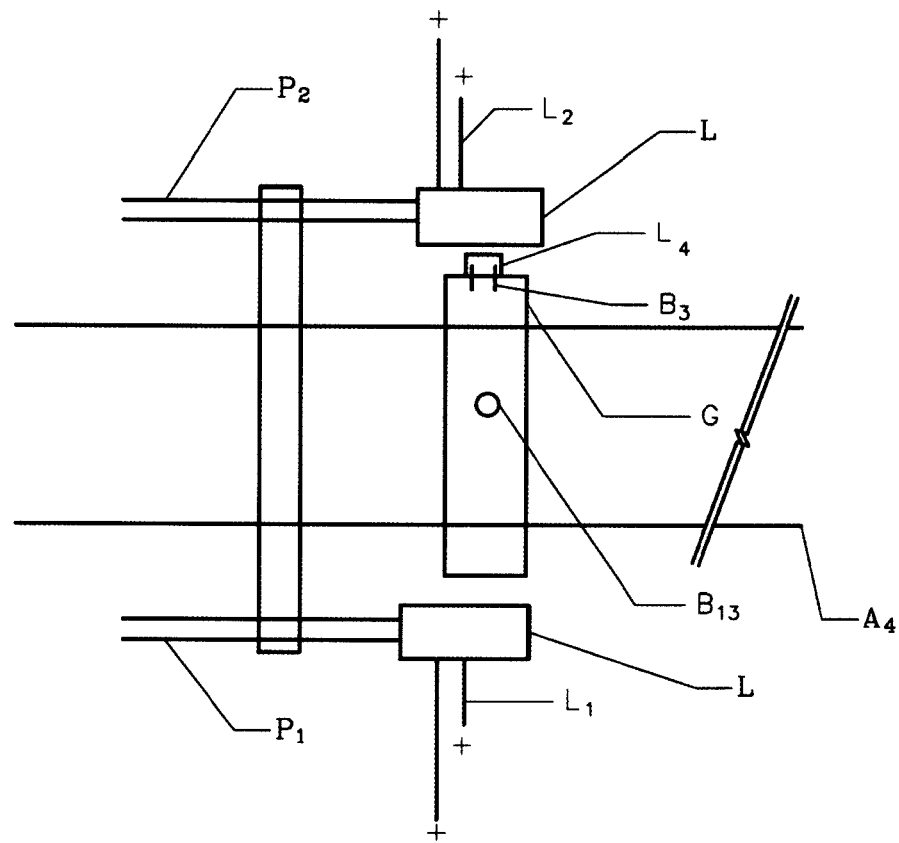
FIGS. 4A and 4B are diagrams of the control circuitry according to an exemplary embodiment of the present invention. (A diagram of the command circuitry which issues the necessary command to the valves)
Figure 4B:
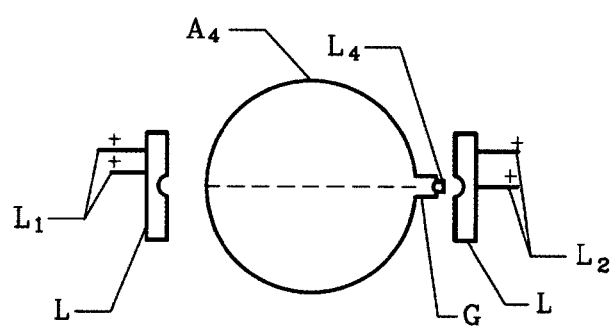
Figure 5A:
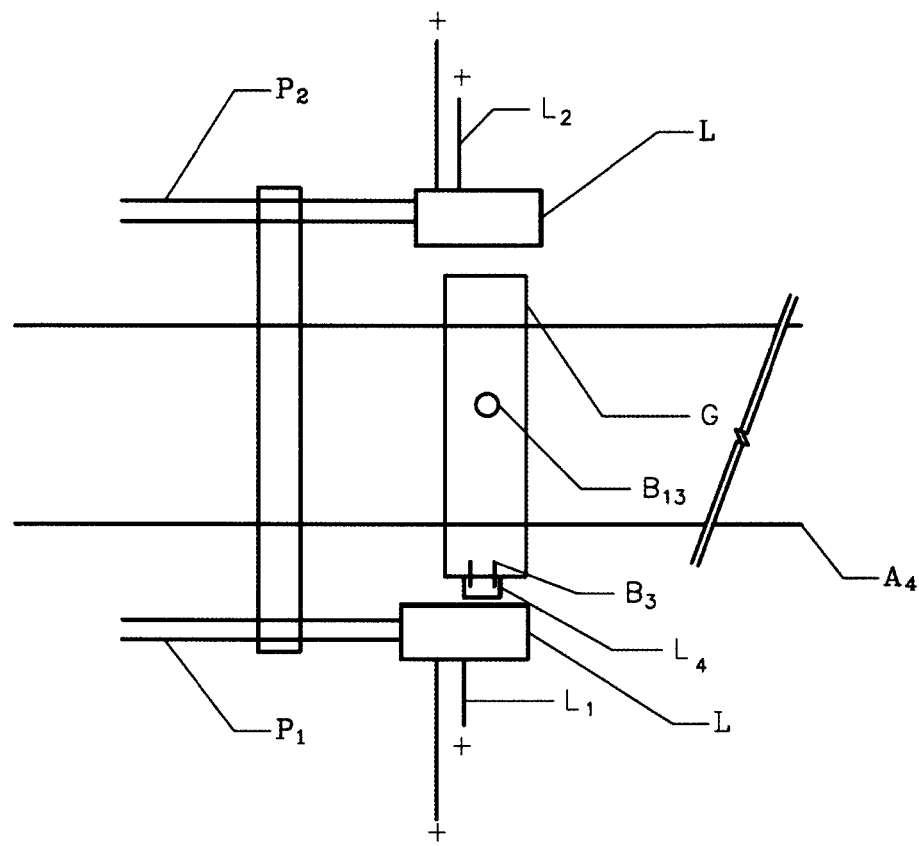
FIGS. 5A and 5B are diagrams of the control circuitry according to an exemplary embodiment of the present invention. (A diagram of the command circuitry in the state where it issues the necessary command to the spark plug and injector)
Figure 5B:
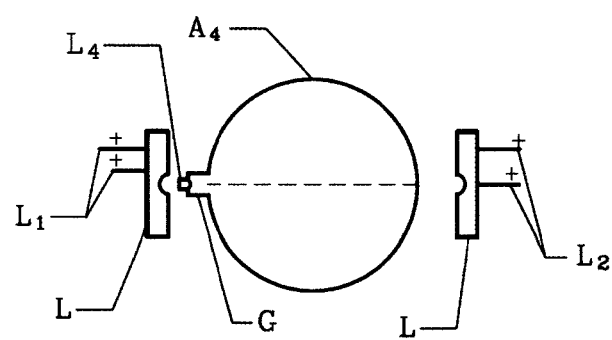
Figure 6:
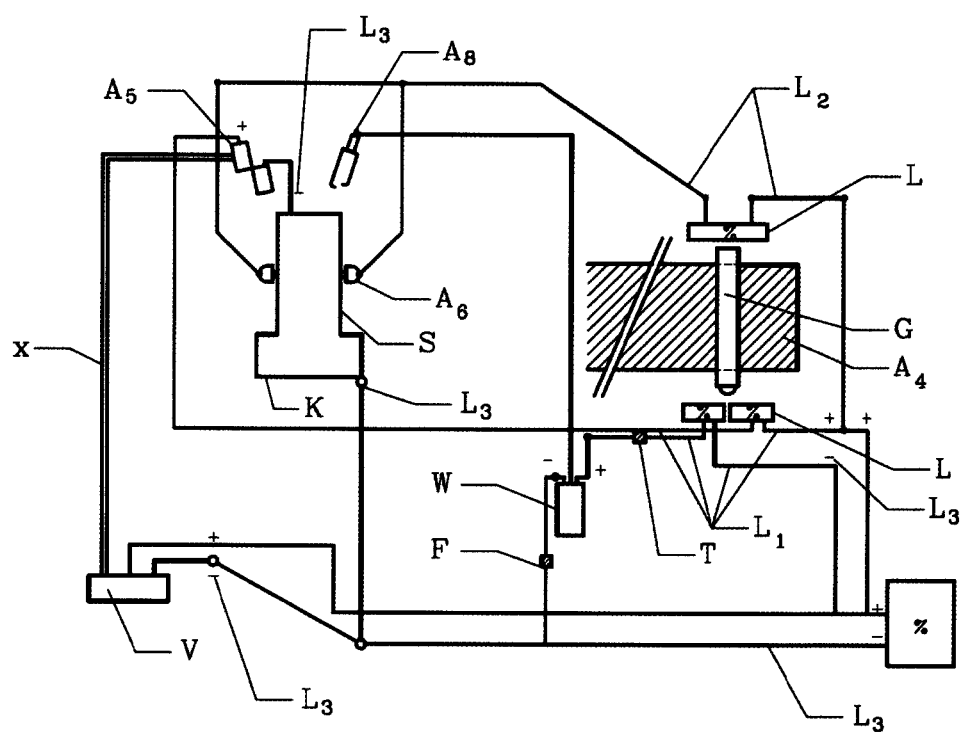
FIG. 6 is a diagram of the power supply system according to an exemplary embodiment of the present invention.

14. (A5) Injector (FIGS. 1 and 2)
15. (L1) Connection wires between sensor, injector, and spark plug (FIGS. 1, 2, 5A, 5B and 6)
16. (L2) Connection wires between sensor and valves (FIGS. 1, 2, 4A, 4B and 6)
17. (K) Oil pan (FIGS. 1 and 2)
18. (A2) Connecting rod pin (FIGS. 1 and 2)
19. (DC) Power supply system (FIG. 6)
20. (C1) Air opening and (C2) smoke opening (FIGS. 1 and 2)
21. (A7) Valve spring (FIGS. 3A and 3C)
22. (A'3) Crankshaft anchor castanet (dip) (FIG. 1)
23. (W) Coil (FIG. 6)
24. (Y) Bearing (FIGS. 1 and 2)
25. (F) Fuse (FIG. 6)
26. (V) Injector pump (FIG. 6)
27. (X) Fuel route (FIG. 6)

Details of the present invention will now be discussed by reference to the drawings.

First, a general operation of the inventive two cycle engine according to an exemplary embodiment of the invention will be provided.

(Referring to FIGS. 1 and 2) Method of operation of the engine: Upon starting, magnet and electric current, drawn from the battery, enters the system. Next, the injector (A5) sprays fuel inside the cylinder (S), and, immediately, the spark plug (A8) creates a spark, combustion takes place, and the piston (A9) is pushed to the other end of the cylinder (S), passing by the cylinder air and smoke holes in its path. As soon as the piston reaches the end of the cylinder, since the crankshaft (A4) moves with the piston (A9), and since the magnetic piece (L4), which is located on one end of the crankshaft bushing, faces the sensor (L) (sensitive toward magnet), it issues the commands, for the opening of air and smoke valves (C1, C2), to the valve (A6), smoke is let out, and air let into the cylinder (FIG. 2). Since the piston (A9) is returned toward the cylinder head from the end of the cylinder (S), by crankshaft anchor (A3), at the instant that the piston moves toward the cylinder head (B1), since the magnet piece (L4) crosses the sensor (L), and since, in the electric valve, there is a spring that (A7), constantly, with the pressure of the spring, causes the closing of air and smoke valves (C1, C2), these holes close again (FIGS. 3A-3C), and the piston returns toward the cylinder head by the crankshaft, passes by the air and smoke holes, that are closed, in its path, and reaches the cylinder head. This action is repeated.

(Referring to FIGS. 1 and 2): (S) Cylinder: of an alloy material which can be used for this purpose. In addition, the volume, thickness, diameter, and length of the cylinder are calculated based on its application. In addition, a hole (S1) has been made for drainage of oil, which is opened and closed through the use of a bolt (S2). The oil is inserted inside the cylinder through the hole (S3), and it is plugged using bolt (S4).

(Referring to FIGS. 1 and 2): (B1) Cylinder head: Spark plug (A8) and injector (A5) have been installed on the cylinder head.

(Referring to FIGS. 1 and 2): (O1) Cylinder head gasket: this part need no description.

(Referring to FIGS. 1 and 2): (A9) Piston: In addition, holes (R) have been made on the piston, under the oil ring, so that, through these holes (R), the oil may be moved from the oil pan (K) to under the oil rings (A12) for lubrication of the cylinder.

(Referring to FIGS. 1 and 2): Rings including (A10) fire ring, (A11) compression ring, (A12) oil ring: It should be noted that, in this engine on the piston, oil ring has been installed (contrary to conventional two-cycle engines).

(Referring to FIGS. 1 and 2): (A15) Connecting rod: this part need no description.

(Referring to FIGS. 1 and 2): (A3) Crankshaft anchor: Spoons have been installed on the crankshaft for the purpose of engine lubrication.

(Referring to FIGS. 1 and 2): (A4) Crankshaft shaft: Bushing (G) has been installed on the crankshaft's outlet shaft.

(Referring to FIGS. 1, 2, 4A, 4B, 5A and 5B): The bushing (G): a bushing (G) is installed on the shaft (A4), and fastened to the shaft by a bolt (B13), on one side of which, a piece of magnet (L4) has been placed, which has been fastened to the bushing by bolt (B3). It should be noted that, once the magnet piece (L4) is situated across from the sensor (L), the necessary command is issued to the valves (A6), spark plugs (A8), and injector (A5) through the sensor.

(Referring to FIGS. 1, 2, 4A, 4B, 5A and 5B): The command circuitry base (P1 and P2): two bases (P1 and P2) have been installed on the cylinder (S) on both sides of the shaft (A4) sticking out of the cylinder (S). On the base (P1), a sensor (L) (sensitive toward magnet) is placed, and, as soon as a magnetic piece (L4), which is located on one end of the crankshaft bushing, faces the sensor (L), the sensor, through the connection wires L1, issues the necessary commands to the spark plug (A8) and injector (A5) (FIGS. 1, 2 and 5). It should be mentioned that a retardant (T) is placed between the sensor (L) and the negative of the coil (W) in order to delay the sparking of the plug for a moment so that fuel may be sprayed inside the cylinder by the injector, and, immediately, the spark plug creates a spark. In addition, on the base (P2), a sensor (L) (sensitive toward magnet) has been placed and, as soon as a magnet piece (L4), which has been placed on one end of the crankshaft bushing, faces the sensor (L), the sensor, through the connection wire L2, issues the command for the valves to open (FIGS. 1, 2, 4A and 4B).

(Referring to FIGS. 1, 2, 4A, 4B, 5A, 5B and 6): (L) Sensor: On the bases of control circuitry (P1 and P2) a sensor (L) has been installed for the purpose of issuing command to the valves, spark plug, and injector.

(Referring to FIGS. 1 and 2): (A6) Valves: two electric valves have been installed on the holes of the cylinder wall (air C1 and Smoke C2), which have been made in the form of a conic, so that they may, by the command of the sensor, open at the desired time. in the electric valve (A6), there is a spring that, constantly, with the pressure of the spring (A7), causes the closing of air and smoke valves (C1, C2), these holes close again.

(Referring to FIGS. 1 and 2): (A8) Spark plug: this part need no description.

(Referring to FIGS. 1 and 2): (A5) Injector: this part need no description.

(Referring to FIGS. 1, 2, 5A, 5B and 6): Connection wires L1 between the sensor (L), spark plug (A8), and injector (A5): the command issued to the spark plug (A8) and injector (A5) is transferred by the connection wires (L1), through a sensor (L) which is on the base (P1).

(Referring to FIGS. 1, 2, 4A, 4B and 6): Connection wires L2 between the sensor (L) and valves (A6): it should be noted that the command issued to the valves (A6) for the opening of the air and smoke valves (C1, C2), is transferred to the valve by the connection wires (L2), through a sensor (L) which is on the base (P2).

(Referring to FIGS. 1 and 2): (K) Oil pan: In this engine, the volume of the oil pan has been increased (relative to conventional two-cycle engines).

(Referring to FIGS. 1 and 2): (A2) Connecting rod pin: this part need no description.

(Referring to FIG. 6): Power supply system DC: first, the positive electricity of the battery enters the command circuitry, injector pump (V), and the positive terminal of the coil (W). Then, it enters the valve and injector magnets through the command circuitry. It is obvious the negative electricity (L3) of the battery enters the body and, through the body, enters to the all of parts.

(Referring to FIGS. 1 and 2): Air hole, (C1) and smoke hole, (C2): the air and smoke holes are placed on both sides of the cylinder, and almost across from each other. These holes are made in the form of a conic on the cylinder wall, such that it becomes completely closed and sealed with the valve which has been designed as a conic.

(Referring to FIGS. 3A and 3C): (A7) Valve spring: Valve spring is always inclined to shut smoke and air valves.

(Referring to FIGS. 1 and 2): (A'3) Crankshaft anchor castanet (dip): since this engine is designed like ordinary (four-cycle) engines, in which oil is poured in its oil pan, and it does not have an oil pump, so some dips are created on the two sides of the crankshaft anchor (A'3 castanet) so that with the rotation of the crankshaft in the oil pan storage, the engine is fully lubricated by the castanets.

(Referring to FIG. 6):) W(Coil: this part need no description.

(Referring to FIGS. 1 and 2): (Y) bearing: this part need no description.

(Referring to FIG. 6): (F) Fuse: this part need no description.

(Referring to FIG. 6): (V) Injector pump: this part need no description.

(Referring to FIG. 6): (X) Fuel route: Fuel is pumped from the injector pump (V) to the injector (A5).

Super Charge system: In this system, a supercharger may be used in order to expedite the outlet of fumes from the cylinder, and also, the injection of air into the cylinder. Also, with the installation of a supercharger, combustion takes place completely, and, as a result, the output and efficiency of the engine improves. It is clear that this takes place through the air and exhaust valves.

By separating oil and fuel and not requiring the mix as fuel, as is used in conventional two cycle engines. The inventive two cycle engine avoids many shortcomings of the conventional two cycle engines.

Additional advantages of the above discussed embodiment of the inventive two cycle engine include:

The gas burning 2-cycle engine which has been presented by us, due to having 1—injectors, 2—electric valves, 3—oil ring and, 4—heater for benzene, 5—supercharger and 6—command circuitry is unique.

Advantages, differences, and superiority: 1—In this engine, due to having heater for benzene, and, especially for injectors, combustion takes place completely. This difference, alone, is an important factor in the design of this engine which has resulted in the advantage in combustion and fuel consumption, and power and speed. It is worth mentioning that, in this engine, combustion takes place completely, and no unburned fuel remains at the tip of the piston. 2—Using a supercharger, the power may be increased by 30 to 50 percent. 3—Due to the installation of finger cymbals on top of the crankshaft, lubrication takes place completely. 4—By installing electric valves on air and smoke openings, the exit of oil, from these openings, is prevented. 5—It is worth mentioning that, through the installation of a command circuitry, which is designed on this 2-cycle engine, the possibility of timely opening of smoke and air valves, in addition to issuing command to the spark plugs and injector, has been created.

It should be noted that, in this system, by installing electric valves and injectors (and adding advantages such as heater and supercharger), we designed the operation of this four-cycle engine in a two-cycle engine.

The present two-cycle engines, due to the mixing of gasoline with oil, create environmental pollution, while in the two-cycle engine designed by us, due to the separation of gasoline from oil, this pollution has been eliminated since the engine only uses gasoline, and, the oil, like in the four-cycle engines, has been placed in the oil pan.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. An internal combustion engine of the two-cycle type comprising:
    a cylinder;
        a combustion chamber defined by a piston slidable within the cylinder and a cylinder head to seal the cylinder at the top;
        an injector for inserting fuel into the combustion chamber;
        a crankshaft to provide reciprocating motion to the piston;
        a pumpless lubricating mechanism for providing lubrication to the engine;
        a valve to prevent the escape of oil from air and smoke openings; wherein
        oil is not mixed with the fuel in the combustion chamber;
        two electric valves; and
        a command control for controlling timely opening and closing of smoke and air valves, spark plugs and the injector.

2. The engine of claim 1 further comprising a heater for heating the fuel prior to the fuel being injected into the combustion chamber.

3. The engine of claim 1 wherein the lubricating mechanism comprises an oil pan located internally to the engine.

4. The engine of claim 3 wherein the lubricating mechanism is designed to serve as an alternative to oil-pump systems and instead relies on a flow of oil stored in the oil pan to flow into the crankshaft, pistons and a plurality of rings.

5. The engine of claim 4 wherein the lubricating mechanism further includes a plurality of finger cymbals placed on top of the crankshaft to assist with the lubrication of the engine.

6. The engine of claim 1, further including a supercharger; wherein the supercharger expedites the outlet of fumes from the cylinder and facilitates the injection of air into the cylinder.

7. An internal combustion engine of the two-cycle type comprising:
    a cylinder;
        a combustion chamber defined by a piston slidable within the cylinder and a cylinder head to seal the cylinder at the top;
        an injector for inserting fuel into the combustion chamber;

a crankshaft to provide reciprocating motion to the piston;
a pump-less lubricating mechanism for providing lubrication to the engine;
a valve to prevent the escape of oil from air and smoke openings; wherein
oil is not mixed with the fuel in the combustion chamber;
two electric valves;
a heater for heating the fuel prior to the fuel being injected into the combustion chamber:
a command control for controlling timely opening and closing of smoke and air valves, spark plugs and the injector; wherein the command control includes a magnetic piece located on the crankshaft facing a sensor that is responsive to said magnet wherein the sensor issues commands for the opening and closing of the smoke and air valves.

8. The engine of claim 7 wherein the lubricating mechanism comprises an oil pan located internally to the engine; and wherein the lubricating mechanism relies on a flow of oil stored in the oil pan to flow into the crankshaft, pistons and a plurality of rings.

9. The engine of claim 8 wherein the lubricating mechanism further includes a plurality of finger cymbals placed on top of the crankshaft to assist with the lubrication of the engine.

10. The engine of claim 7, further including a supercharger; wherein the supercharger expedites the outlet of fumes from the cylinder and facilitates the injection of air into the cylinder.

* * * * *